(12) United States Patent
Shin et al.

(10) Patent No.: US 11,565,426 B2
(45) Date of Patent: Jan. 31, 2023

(54) MOVABLE ROBOT AND METHOD FOR TRACKING POSITION OF SPEAKER BY MOVABLE ROBOT

(71) Applicant: LG ELECTRONICS INC., Seoul (KR)

(72) Inventors: Wonho Shin, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 672 days.

(21) Appl. No.: 16/489,690

(22) PCT Filed: Jul. 19, 2019

(86) PCT No.: PCT/KR2019/008928
§ 371 (c)(1),
(2) Date: Aug. 28, 2019

(87) PCT Pub. No.: WO2021/015302
PCT Pub. Date: Jan. 28, 2021

(65) Prior Publication Data
US 2021/0354310 A1    Nov. 18, 2021

(51) Int. Cl.
*B25J 13/08* (2006.01)
*B25J 13/00* (2006.01)
*H04R 3/00* (2006.01)

(52) U.S. Cl.
CPC .......... *B25J 13/003* (2013.01); *B25J 13/088* (2013.01); *H04R 3/005* (2013.01)

(58) Field of Classification Search
CPC .............. H04R 3/005; H04R 2430/21; H04R 2201/025; G01S 3/8083; B25J 13/088; B25J 13/003; B25J 11/008
See application file for complete search history.

(56) References Cited

U.S. PATENT DOCUMENTS

2002/0097885 A1* 7/2002 Birchfield .............. H04R 1/406
381/92
2002/0181721 A1* 12/2002 Sugiyama ................. G01S 5/20
381/92

(Continued)

FOREIGN PATENT DOCUMENTS

KR   1020070061056    6/2007
KR   1020090116089    11/2009

(Continued)

OTHER PUBLICATIONS

PCT International Application No. PCT/KR2019/008928, International Search Report dated Apr. 14, 2020, 3 pages.

*Primary Examiner* — Stephen Holwerda
(74) *Attorney, Agent, or Firm* — Lee, Hong, Degerman, Kang & Waimey PC

(57) ABSTRACT

Proposed is a method for determining, by a movable robot, a position of a speaker, wherein the movable robot includes first to fourth microphones installed at four vertexes of a quadrangle of a horizontal cross section of the robot respectively, wherein the method includes: receiving a wake-up voice through first and third microphones disposed respectively at first and third vertices in a diagonal direction; obtaining a first reference value of the first microphone and a second reference value of the third microphone based on the received wake-up voice; comparing the obtained first and second reference values to select the first microphone; selecting a second microphone disposed at a second vertex, wherein the first and second microphones are on a front side of the quadrangle; calculating a sound source localization (SSL) value based on the selected first and second microphones; and tracking a position of the speaker based on the SSL value.

14 Claims, 13 Drawing Sheets

(56) References Cited

U.S. PATENT DOCUMENTS

| | | | |
|---|---|---|---|
| 2004/0037436 A1* | 2/2004 | Rui | H04R 3/005 |
| | | | 381/92 |
| 2009/0279714 A1* | 11/2009 | Kim | H04R 3/005 |
| | | | 901/1 |
| 2010/0034397 A1 | 2/2010 | Nakadai et al. | |
| 2011/0103191 A1* | 5/2011 | Shin | G01S 3/8083 |
| | | | 367/125 |
| 2015/0055797 A1* | 2/2015 | Nguyen | H04R 3/005 |
| | | | 381/92 |
| 2016/0173978 A1* | 6/2016 | Li | G10L 21/0364 |
| | | | 381/92 |
| 2016/0212525 A1* | 7/2016 | Nakadai | H04R 1/406 |
| 2018/0152784 A1* | 5/2018 | Kim | H04R 1/02 |
| 2018/0286432 A1* | 10/2018 | Shimada | G10L 15/24 |

FOREIGN PATENT DOCUMENTS

| | | |
|---|---|---|
| KR | 1020110121304 | 11/2011 |
| KR | 101645135 | 8/2016 |

* cited by examiner

<Basic setup of two microphones for angle of arrival estimation> fig. 7
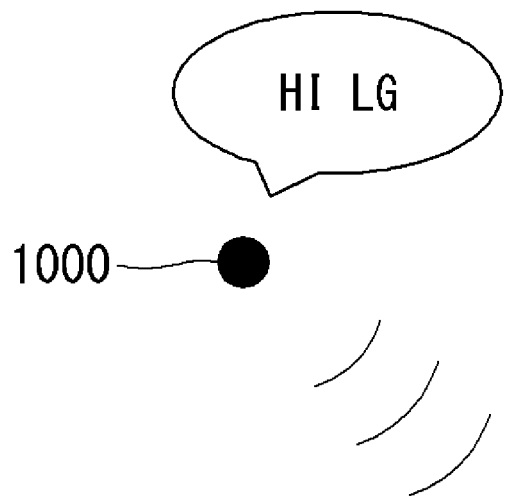
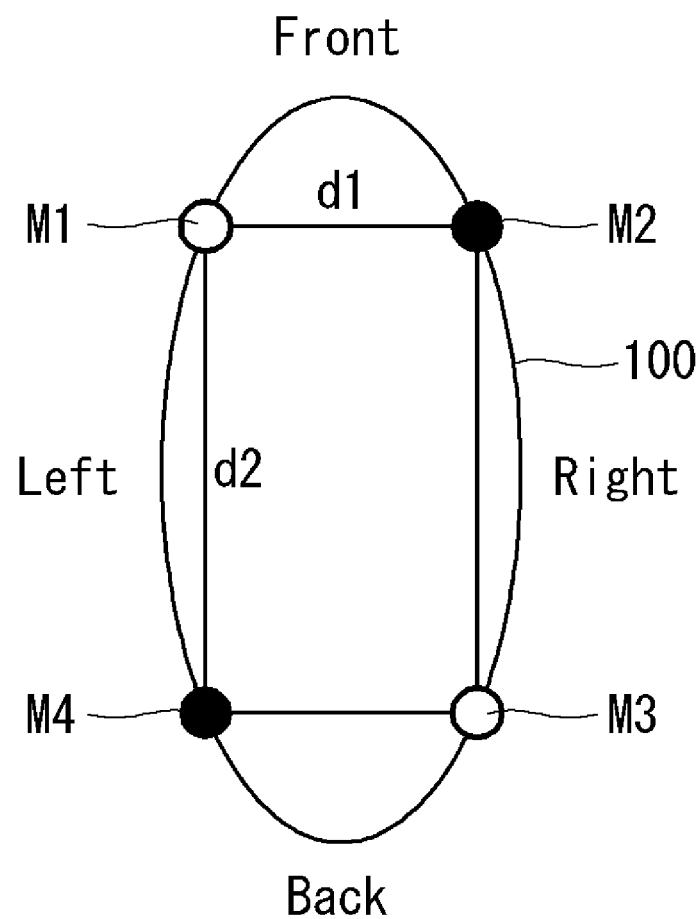

MOVABLE ROBOT AND METHOD FOR TRACKING POSITION OF SPEAKER BY MOVABLE ROBOT

CROSS-REFERENCE TO RELATED APPLICATIONS

This application is the National Stage filing under 35 U.S.C. 371 of International Application No. PCT/KR2019/008928, filed on Jul. 19, 2019, the contents of which are all hereby incorporated by reference herein in its entirety.

TECHNICAL FIELD

The present disclosure relates to a method of tracking a position of a speaker by a movable robot and a movable robot operating in accordance with the method.

BACKGROUND ART

In recent years, a movable robot has been introduced and used in order to more effectively provide various services to users in public places such as airports. Users may use various services such as airport guidance service, boarding information guidance service, and other multimedia contents provision service via the robot arranged at the airport.

Generally, the robot placed at an airport recognizes a wake-up voice and operates. In the airport, many people come and go. Thus, there is a problem that it is not easy for the robot to identify a speaker who utters the wake up voice thereto.

Furthermore, when the robot is small, a voice of the speaker may be directly transmitted to a microphone installed in the robot. Thus, it may be easy for the robot to locate the speaker. However, because the voice of the speaker may not be directly transmitted to a tall robot, it is difficult for the tall robot to find the position of the speaker.

More specifically, a commonly used method for locating a speaker by a robot is GCC (Generalized Cross Correlation) algorithm. FIG. 1 is a diagram for illustrating a concept of the GCC algorithm. When it is assumed that a first microphone mic1 and a second microphone mic2 are in the same line, the first microphone and the second microphone are separated by a first distance d, and, thus, a distance between the second microphone and a speaker is larger by $\lambda$ than a distance between the first microphone and the speaker (sound source). In this connection, when assuming that a position of the speaker is inclined by a first angle $\theta$ with respect to a normal line perpendicular to a straight line connecting the first microphone mic 1 and the second microphone mic 2, the angle $\theta$ may be obtained based on a trigonometric function, and, thus, a direction of the speaker can be traced.

In this connection, such a GCC algorithm uses TDOA (time difference of arrival) for voices arriving at the two microphones to estimate the direction of the speaker.

Therefore, in order to track the position of the speaker according to the GCC algorithm, this approach requires two microphones to receive the voice as a sample. Therefore, if the voice is not received properly by one of the two microphones, it may be virtually impossible to estimate the direction of the speaker.

In one example, this problem is outstanding as the robot is bigger. The robot may include at least two microphones, one being disposed at a front thereof and the other being disposed at a back thereof.

However, when the speaker speaks a wake-up voice in front of the robot, the microphone installed at the rear of the robot may not receive the voice while the robot body blocks the voice. Alternatively, the microphone installed in the back of the microphone has degradation in the voice receiving quality not to be able to calculate the GCC value. As a result, the position of the speaker cannot be estimated because the direction of the speaker is not known.

DISCLOSURE

Technical Problem

The present disclosure aims at solving the above-mentioned needs and/or problems.

A purpose of the present disclosure is to provide a movable robot to more accurately track a direction of a speaker based on a wake-up voice picked up by the movable robot.

Technical Solution

In one aspect of the present disclosure, there is proposed a method for determining, by a movable robot, a position of a speaker by searching for a direction in which a wake-up voice is uttered from the speaker, wherein the movable robot includes first to fourth microphones installed at four vertexes of a quadrangle of a horizontal cross section of the robot respectively, wherein the method includes: receiving a wake-up voice through first and third microphones disposed respectively at first and third vertices in a diagonal direction; obtaining a first reference value of the first microphone and a second reference value of the third microphone based on the received wake-up voice; comparing the obtained first and second reference values to select the first microphone; selecting a second microphone disposed at a second vertex, wherein the first and second microphones are on a front side of the quadrangle; calculating a sound source localization (SSL) value based on the selected first and second microphones; and tracking a position of the speaker based on the SSL value.

In one embodiment, the first and second reference values are respectively gains of the first and third microphones, confidence scores of the first and third microphones or times required for the first and third microphones to receive the wake-up voice.

In one embodiment, the method further includes: obtaining a third reference value based on the first microphone and a fourth microphone disposed at a fourth vertex of the quadrangle; obtaining a fourth reference value based on the second microphone disposed at the second vertex and the third microphone; comparing the obtained third and fourth reference values to select the fourth microphone; wherein tracking the position of the speaker includes: obtaining a first SSL value based on the first and second microphones among the selected first, second, and fourth microphones; obtaining a second SSL value based on the first and fourth microphones among the selected first, second, and fourth microphones; and determining the position of the speaker based on the first and second SSL values.

In one embodiment, the method further includes: determining whether the first SSL value is within a first angle range, wherein the first angle range is a first preset angle range based on a center of the robot, wherein when the speaker is in the first preset angle range, the first and second microphones reliably receive the wake up voice from the speaker; and when the first SSL value is within the first angle range, determining the first SSL value as the position of the speaker.

In one embodiment, the method further includes: when the first SSL value is not within the first angle range, determining whether the second SSL value is within a second angle range, wherein the second angle range is a second preset angle range based on a center of the robot, wherein when the speaker is in the second preset angle range, the first and fourth microphones reliably receive the wake up voice from the speaker; and when the second SSL value is within the second angle range, determining the second SSL value as the position of the speaker.

In one embodiment, the quadrangle is rectangular, wherein a distance between the first and second microphones is smaller than a distance between the first and fourth microphones, wherein the first angle range is greater than the second angle range.

In one embodiment, the first angle range is between 270 to 90 degrees, wherein the second angle range is between 240 to 310 degrees, wherein the first angle range is set to partially overlap the second angle range.

In one embodiment, each of the third and fourth reference values is a gain of a corresponding microphone, wherein the third reference value is a sum of gains of the first microphone and the fourth microphone, wherein the fourth reference value is a sum of gains of the second microphone and the third microphone.

In another aspect of the present disclosure, there is proposed a movable robot for determining a position of a speaker by executing the above method.

Technical Effects

According to an embodiment of the present disclosure, any one of the front and rear orientations of the four orientations is selected, and one of the left and right orientations thereof is selected, to accurately track the direction of the speaker based on a GCC value according to the selected orientations.

The effects obtainable by the present disclosure are not limited to the effects mentioned above. Other advantages as not mentioned will be apparent to those skilled in the art from the description below.

BRIEF DESCRIPTION OF THE DRAWINGS

The accompanying drawings, which are included as a part of the specification to facilitate understanding of the present disclosure, provide examples of the present disclosure and, together with the detailed description, illustrate the technical features of the present disclosure.

FIG. 7 and FIG. 8 illustrate an operation of a movable robot when the movable robot recognizes a wake up voice.

DETAILED DESCRIPTIONS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G™ communication (5th generation mobile communication) required by an apparatus requiring AI processed information and/or an AI processor will be described through paragraphs A through G.

A. Example of Block Diagram of UE and 5G™ Network

Figure 2:
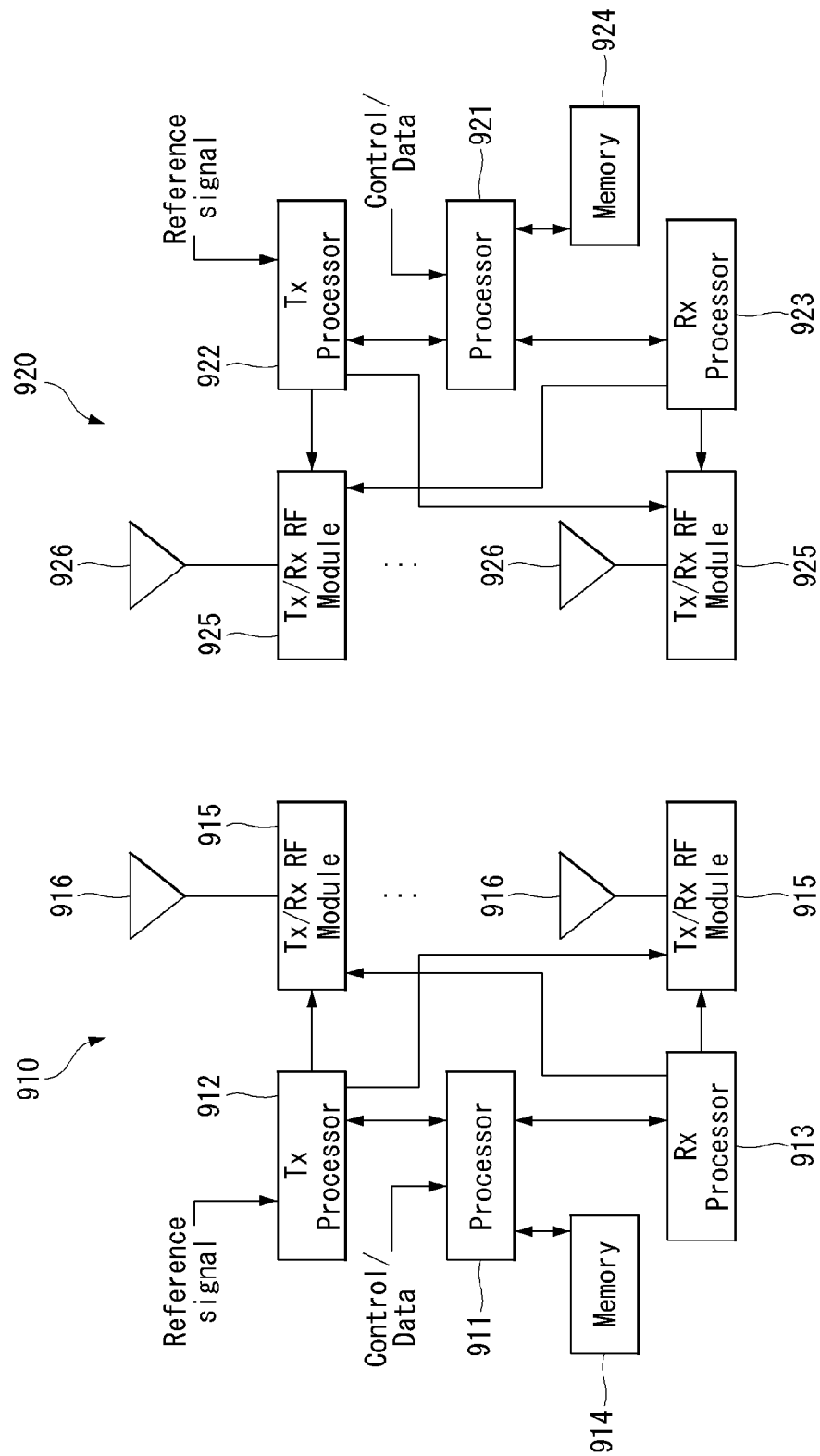
FIG. 2 illustrates a block diagram of a wireless communication system to which methods proposed herein may be applied.

FIG. 2 is a block diagram of a wireless communication system to which methods proposed in the disclosure are applicable.

Figure 1:
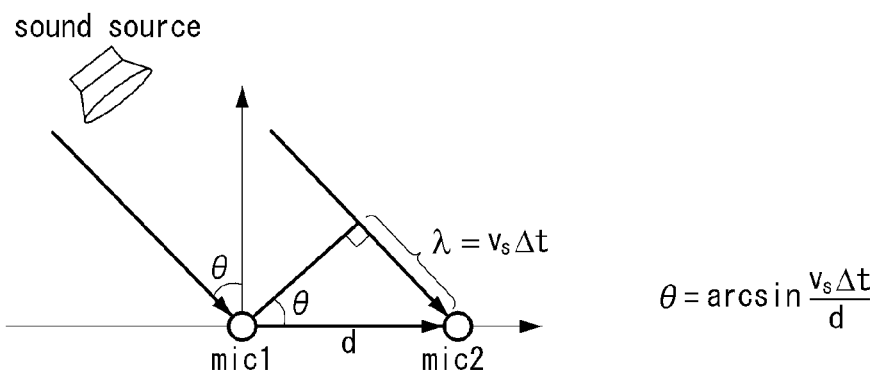
FIG. 1 shows the concept of the GCC algorithm.

Referring to FIG. 2, a device (autonomous device) including an autonomous module is defined as a first communication device (910 of FIG. 1), and a processor 911 can perform detailed autonomous operations.

A 5G™ network including another vehicle communicating with the autonomous device is defined as a second communication device (920 of FIG. 1), and a processor 921 can perform detailed autonomous operations.

The 5G™ network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G' services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
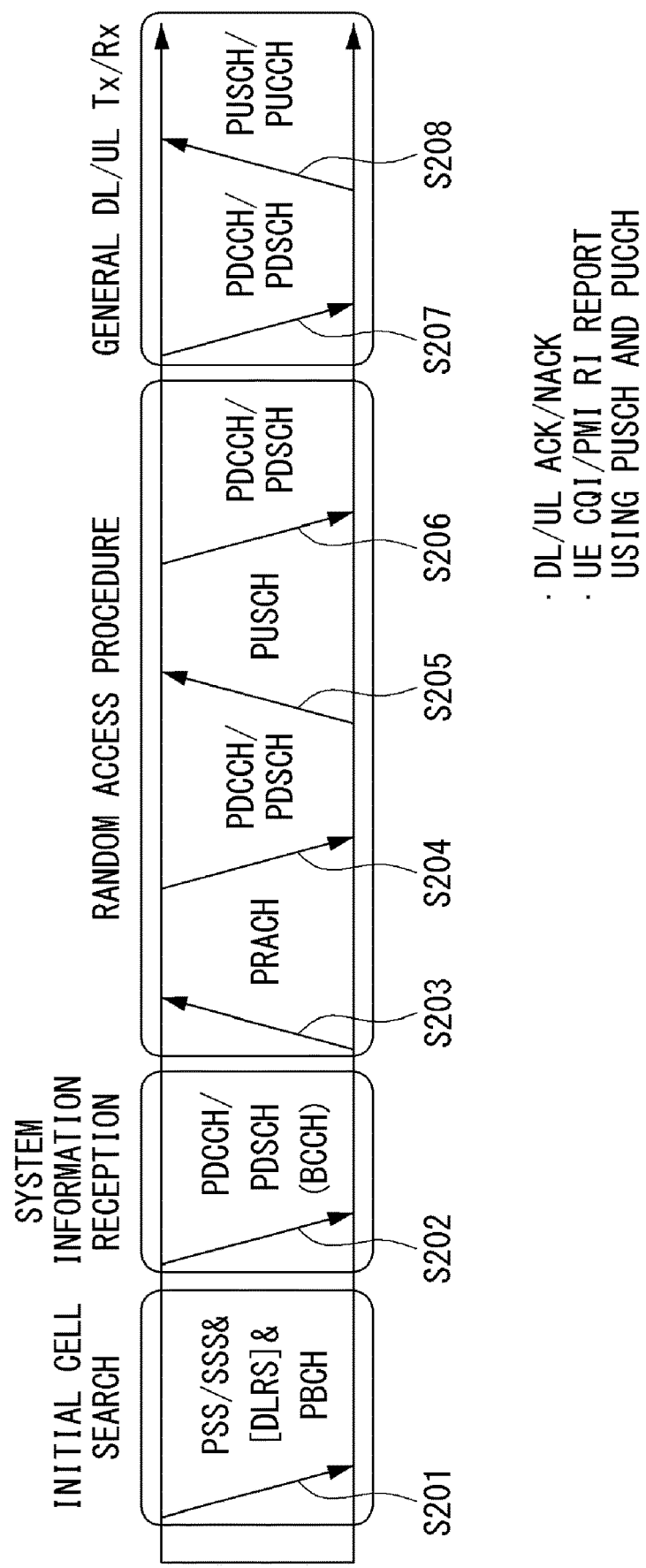
FIG. 3 shows an example of a signal transmission/reception method in a wireless communication system.

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G™ communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G™ communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G™ Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.
- When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G™ scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G™ Communication

Figure 4:
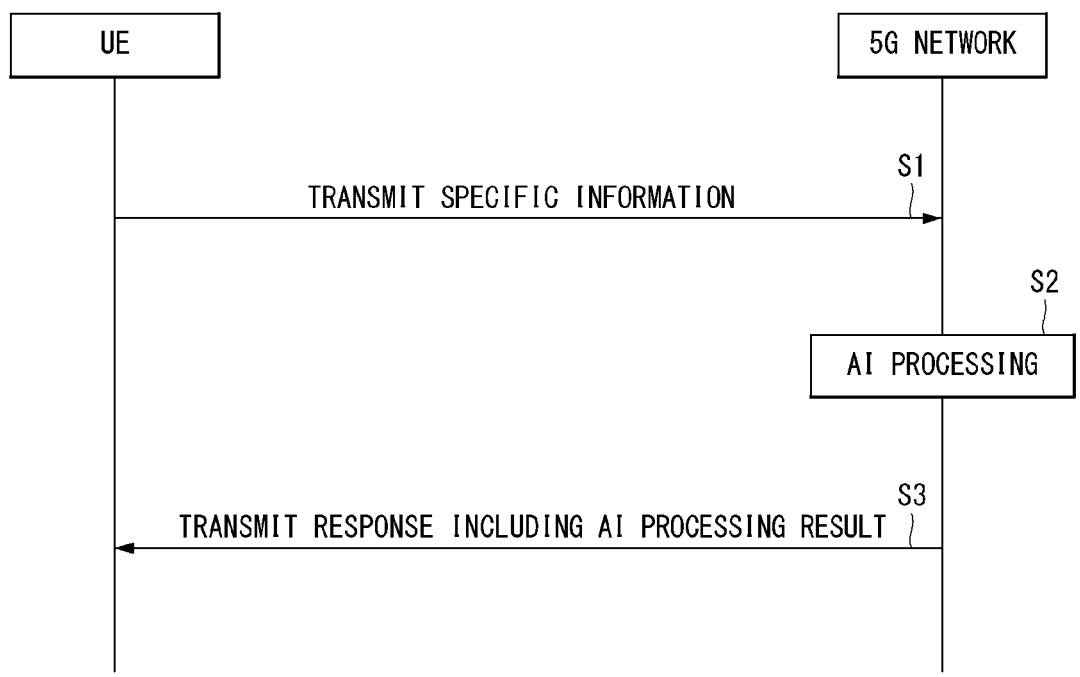
FIG. 4 shows an example of a basic operation of UE and a 5G™ network in a 5G™ communication system.

FIG. 4 shows an example of basic operations of an autonomous vehicle and a 5G™ network in a 5G™ communication system.

The autonomous vehicle transmits specific information to the 5G™ network (S1). The specific information may include autonomous driving related information. In addition, the 5G™ network can determine whether to remotely control the vehicle (S2). Here, the 5G™ network may include a server or a module which performs remote control related to autonomous driving. In addition, the 5G™ network can transmit information (or signal) related to remote control to the autonomous vehicle (S3).

G. Applied Operations Between Autonomous Vehicle and 5G™ Network in 5G™ Communication System Hereinafter, the operation of an autonomous vehicle using 5G™ communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G™ communication are applied will be described.

As in steps S1 and S3 of FIG. 4, the autonomous vehicle performs an initial access procedure and a random access procedure with the 5G™ network prior to step S1 of FIG. 3 in order to transmit/receive signals, information and the like to/from the 5G™ network.

More specifically, the autonomous vehicle performs an initial access procedure with the 5G™ network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G™ network.

In addition, the autonomous vehicle performs a random access procedure with the 5G™ network for UL synchronization acquisition and/or UL transmission. The 5G™ network can transmit, to the autonomous vehicle, a UL grant for scheduling transmission of specific information. Accordingly, the autonomous vehicle transmits the specific information to the 5G™ network on the basis of the UL grant. In addition, the 5G™ network transmits, to the autonomous vehicle, a DL grant for scheduling transmission of 5G™ processing results with respect to the specific information. Accordingly, the 5G™ network can transmit, to the autonomous vehicle, information (or a signal) related to remote control on the basis of the DL grant.

Next, a basic procedure of an applied operation to which a method proposed by the present invention which will be described later and URLLC of 5G™ communication are applied will be described.

As described above, an autonomous vehicle can receive DownlinkPreemption IE from the 5G™ network after the autonomous vehicle performs an initial access procedure and/or a random access procedure with the 5G™ network. Then, the autonomous vehicle receives DCI format 2_1 including a preemption indication from the 5G™ network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G™ network.

Next, a basic procedure of an applied operation to which a method proposed by the present invention which will be described later and mMTC of 5G™ communication are applied will be described.

Description will focus on parts in the steps of FIG. 3 which are changed according to application of mMTC.

In step S1 of FIG. 4, the autonomous vehicle receives a UL grant from the 5G™ network in order to transmit specific information to the 5G™ network. Here, the UL grant may include information on the number of repetitions of transmission of the specific information and the specific information may be repeatedly transmitted on the basis of the information on the number of repetitions. That is, the autonomous vehicle transmits the specific information to the 5G™ network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G™ communication technology can be combined with methods proposed in the present invention which will be described later and applied or can complement the methods proposed in the present invention to make technical features of the methods concrete and clear.

Figure 5:
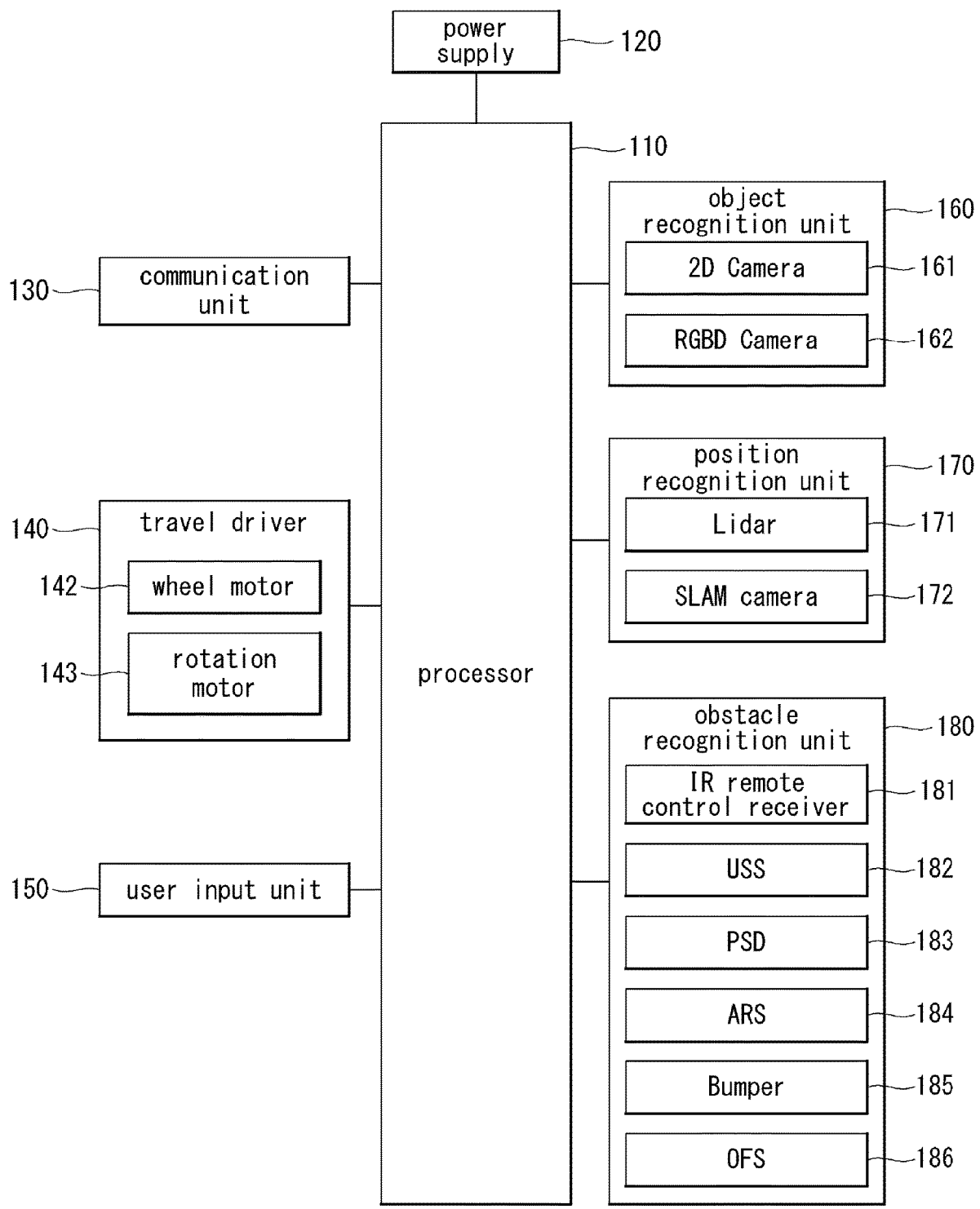
FIG. 5 and FIG. 6 show functional blocks and appearance of a movable robot according to an embodiment of the present disclosure, respectively.
Figure 6:
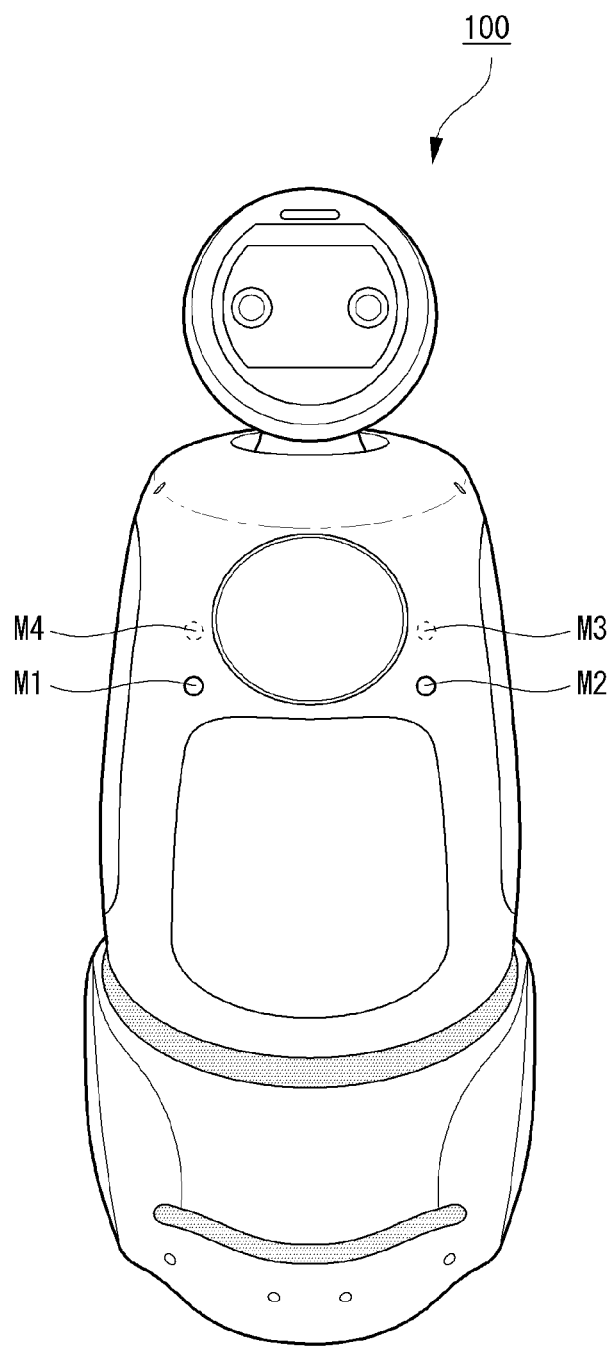

FIG. 5 and FIG. 6 show functional blocks and appearance of a movable robot according to an embodiment of the present disclosure, respectively.

The movable robot 100 of the embodiment may be disposed at an airport and function to provide patrol, route guidance, baggage guidance, airport information, takeoff and landing information of an airplane, terminal information and the like to the user in the airport.

For such a function, the movable robot 100 may be connected to the server through the above-mentioned 5G™ communication technology. The robot 100 may request necessary information to the server and receive the information from the server and then provide the information to the user.

The movable robot 100 may receive commands directly from the user. For example, the robot 100 may directly receive the command from the user when the user touches a display unit provided in the movable robot 100, or utters a voice command.

When the wake up voice is input thereto, the movable robot 100 activates a voice recognition function in response to the wake-up voice uttered by the user. The voice command as received from the user is transmitted to the AI processor 111 installed in the movable robot 100 or to the server connected thereto through the 5G™ communication technology. Then, the voice command as received from the user may be recognized by the AI processor or the server such that the robot 100 may operate based on a specific command requested by the user.

The movable robot 100 may include a 3D depth sensor, an RGB camera, an odometry (a wheel encoder and a gyro sensor) capable of estimating a mileage, and may be defined as an autonomous movable robot 100 moving freely in an area.

The movable robot 100 may include a processor 110, a power supply 120, a communication unit 130, a travel driver 140, a user input unit 150, an object recognition unit 160, a position recognition unit 170 and an obstacle recognition unit 180.

The processor 110 may include a microcomputer for managing the power unit 120 including a battery or the like among hardware of the robot, the obstacle recognition unit 180 including various sensors, and the travel driver 140 including a plurality of motors and wheels.

Further, the processor 110 may include an AP (Application Processor) that manages the entire system of the hardware module of the robot. The AP may deliver the application program for traveling using the location information obtained through various sensors and the user input/output information to the microcomputer, thereby performing movement of the motor and the like. Further, the user input unit 150, the object recognition unit 160, and the position recognition unit 170 may be managed by the AP.

Further, the processor 110 may include the AI processor 111. The AI processor 111 may learn a neural network using a program stored in a memory. In particular, the AI processor 21 may learn a neural network for recognizing data around the robot. In this connection, the neural networks may include a deep-learning model developed from a neural network model. In the deep learning model, multiple network nodes are located on different layers and exchange data with each other according to a convolution relationship. Examples of the neural network model may include various deep-learning schemes such as DNN (deep neural network), CNN (convolutional deep neural network), recurrent neural network (RNN), Restricted Boltzmann Machine (RBM), deep belief network (DBN), and deep Q-Network. The neural network model may be applied to computer vision, voice recognition, natural language processing, voice/signal processing, and the like.

The robot may implement at least one function among voice recognition, object recognition, position recognition, obstacle recognition, and/or movement control by applying a deep learning model through the AI processor 111. Further, the robot receives a result of AI processing from an external server through a communication unit, thereby implementing the at least one function as described above.

The power supply 120 may include a battery driver and a lithium-ion battery. The battery driver may manage the charging and discharging of the lithium-ion battery. The lithium-ion battery can supply power for movement of the robot. The lithium-ion battery 122 may be constructed by connecting two 24V/102A lithium-ion batteries in parallel.

The communication unit 130 may include not only components to receive signals/data from an external input, but also various additional components such as a wireless communication module (not shown) for wireless communication and a tuner (not shown) for tuning a broadcast signal, depending on the configuration of the robot 100. In addition to receiving a signal from an external device, the communication unit 130 may be capable of transmitting information/data/signals of the robot 100 to an external device. That is, the communication unit 130 may not be limited to a configuration for receiving a signal from an external device but may be implemented as an interface capable of bi-directional communication. The communication unit 130 may receive a control signal for selecting a UI from a plurality of control devices. The communication unit 130 may be embodied as a communication module for publicly known short range wireless communication schemes such as a wireless LAN (WiFi), Bluetooth, IR Infrared, UWB (Ultra Wideband), ZigBee, or may be embodied as a mobile communication module for 3G, 4G, LTE and 5G™ communications. The communication unit 130 may be configured as a known communication port for wired communication. The communication unit 130 may be used for various purposes such as transmission and reception of a command for operating a display, data, and the like in addition to the control signal for selecting the UI.

The travel driver 140 may include a wheel motor 142 and a rotation motor 143. The wheel motor 142 may move a plurality of wheels for running the robot. The rotation motor 143 may rotate for left-right rotation, and up-down rotation of a main body of the robot or a head portion of the robot, or for switching or rotating a direction of the wheel of the robot.

In one example, for the robot programmed to perform a specific function, an additional function of the travel driver for performing the specific function may be provided.

The user input unit 150 transmits various preset control commands or information to the processor 110 according to user's manipulation and input. The user input unit 150 may be realized as a menu key or a panel key installed on an outside of the display device or a remote controller separated from the robot 100. Alternatively, the user input unit 150 may be integrated with the display unit (not shown). When the display unit is a touch screen, the user touches the input menu (not shown) on the display unit to transmit a predetermined command to the processor 110.

The user input unit 150 may sense a user's gesture through a sensor that senses an area and transmit the user's command to the processor 110. The voice command of the user is transmitted from the user input unit 150 to the processor 110 to perform operations and settings.

The object recognition unit 160 may include a 2D camera 161 and an RGBD camera 162. The 2D camera 161 may be a sensor for recognizing a person or an object based on a two-dimensional image. The RGBD (Red, Green, Blue, Distance) cameras 162 may be sensors for tracking people or objects using captured images with depth data obtained from cameras with RGBD sensors or other similar 3D imaging devices.

The position recognition unit 170 may include a Lidar, 171 and a SLAM camera 172. The SLAM camera (Simultaneous Localization and Mapping camera) 172 may implement the simultaneous location tracking and mapping technology. The robot can track the surrounding environment information using the SLAM camera 172 and process the obtained information to create a map corresponding to a task execution space and at the same time to estimate its own absolute position. The light detection and ranging (Lidar) 171 may be a laser radar and may be a sensor that performs position recognition by irradiating a laser beam and by collecting and analyzing backscattered light among light absorbed or scattered by the aerosol. The position recognition unit 170 may process sensing data collected from the Lidar 171 and the SLAM camera 172 to manage data for recognizing a position of the robot and for recognizing the obstacle.

The obstacle recognition unit 180 may include an IR remote control receiver 181, a USS 182, a Cliff PSD 183, an ARS 184, a bumper 185, and an OFS 186. The IR remote control receiver 181 may include a sensor for receiving signals from an IR Infrared remote controller for remotely controlling the robot. The USS (Ultrasonic sensor) 182 may include a sensor for determining the distance between the obstacle and the robot using ultrasonic signals. The Cliff PSD 183 may include sensors to detect cliffs in a robot forward travel range across a 360-degree. The ARS (Attitude Reference System) 184 may include a sensor capable of tracking the attitude of the robot. The ARS 184 may include a sensor composed of accelerometer 3-axes and gyro 3-axes for tracking the rotation of the robot. The bumper 185 may include a sensor that detects a collision between the robot and the obstacle. Sensors included in the bumper 185 may detect collisions between robots and obstacles in a 360-degree range. The OFS (Optical Flow Sensor) 186 may include a sensor for detecting the free-rotation of the wheels of the robot during its travel and a sensor for measuring the travel distance of the robot on various floor surfaces.

The movable robot 100 constructed as described above may further include four microphones for recognizing the user's voice.

The movable robot 100 in this embodiment may include first to fourth microphones disposed at apexes of a quadrangle with respect to a plane.

The placement of the microphone is illustrated in FIG. 7.

A body of the movable robot 100 may be configured to have an elliptical shape when viewed in a plan view. A first microphone M1 and a second microphone M2 may be disposed on a front face of the movable robot 100. A third microphone M3 and a fourth microphone M4 may be disposed on a rear surface thereof. The body of the movable robot 100 has a substantially elliptical shape, such that the first microphone M1 to the fourth microphone M4 are arranged at the respective corner points of the rectangle.

In this connection, the first microphone M1 to the fourth microphone M4 may define a rectangle configured such that a distance d1 between the first microphone M1 and the second microphone M2 is smaller than a distance d2 between the first microphone M1 and the fourth microphone M4.

Figure 8:
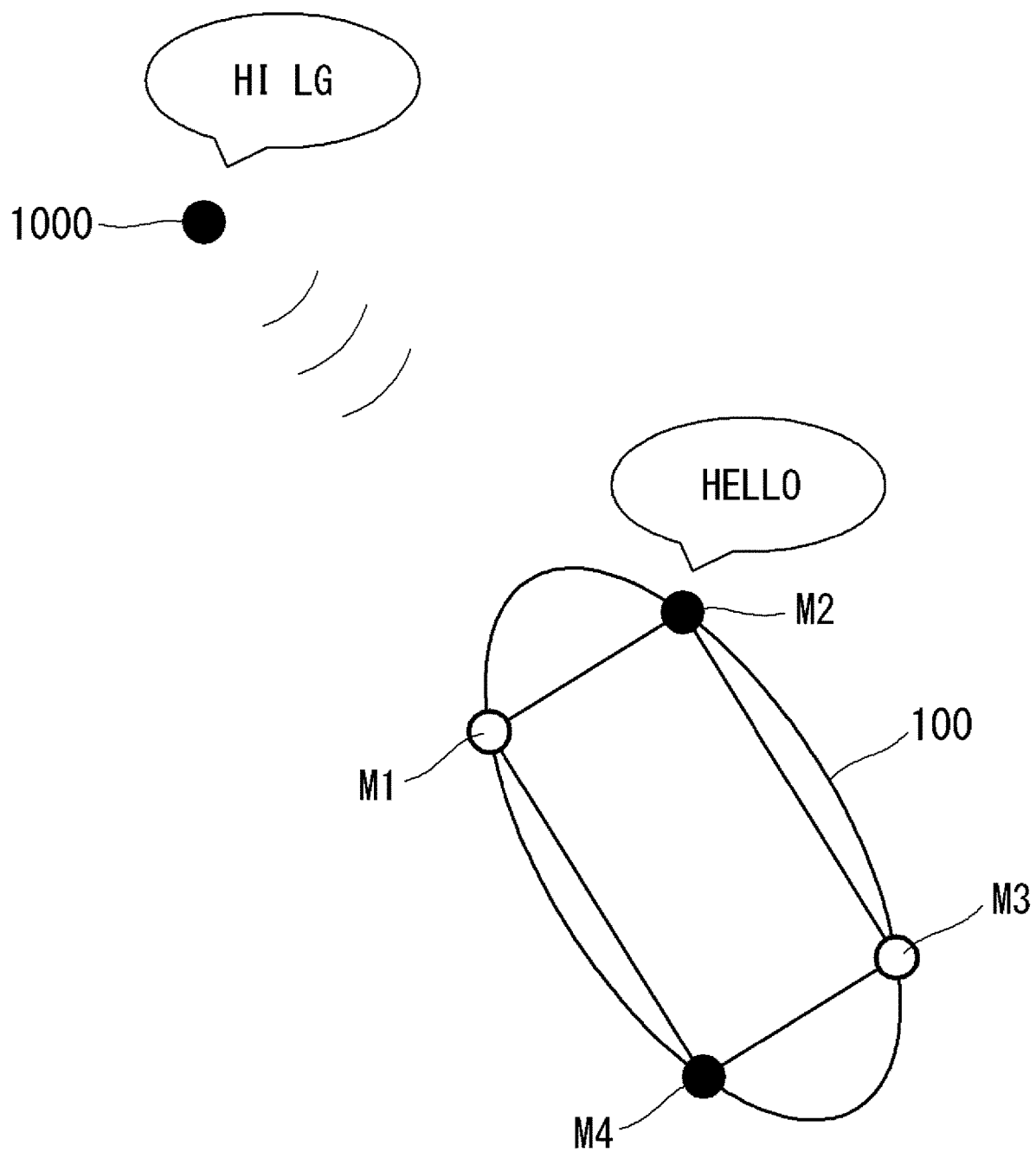

As illustrated in FIG. 7 and FIG. 8, when the speaker 1000 near the mobile robot 100 utters the wake-up voice ("Hi LG"), the movable robot 100 according to an embodiment of the present invention selects one of a forward direction or a rear direction using diagonally arranged microphones and selects two microphones arranged in one of the front and rear faces of the robot corresponding to the selected direction to track the position of the speaker.

Alternatively, to further increase the confidence score, the movable robot 100 may select either forward or backward and then select either a left direction or a right direction and thereby select a total of three microphones based on the selected two directions. Then, the movable robot 100 may generate an SSL value by applying the generalized cross correlation (GCC) algorithm to the selected three microphones (e.g., the first, second, and fourth microphones are selected when the forward direction and left direction are selected) and then track the position of the speaker based on the SSL value.

Hereinafter, how to track the direction of the speaker using the four microphones installed in the movable robot 100 will be described.

Figure 9:
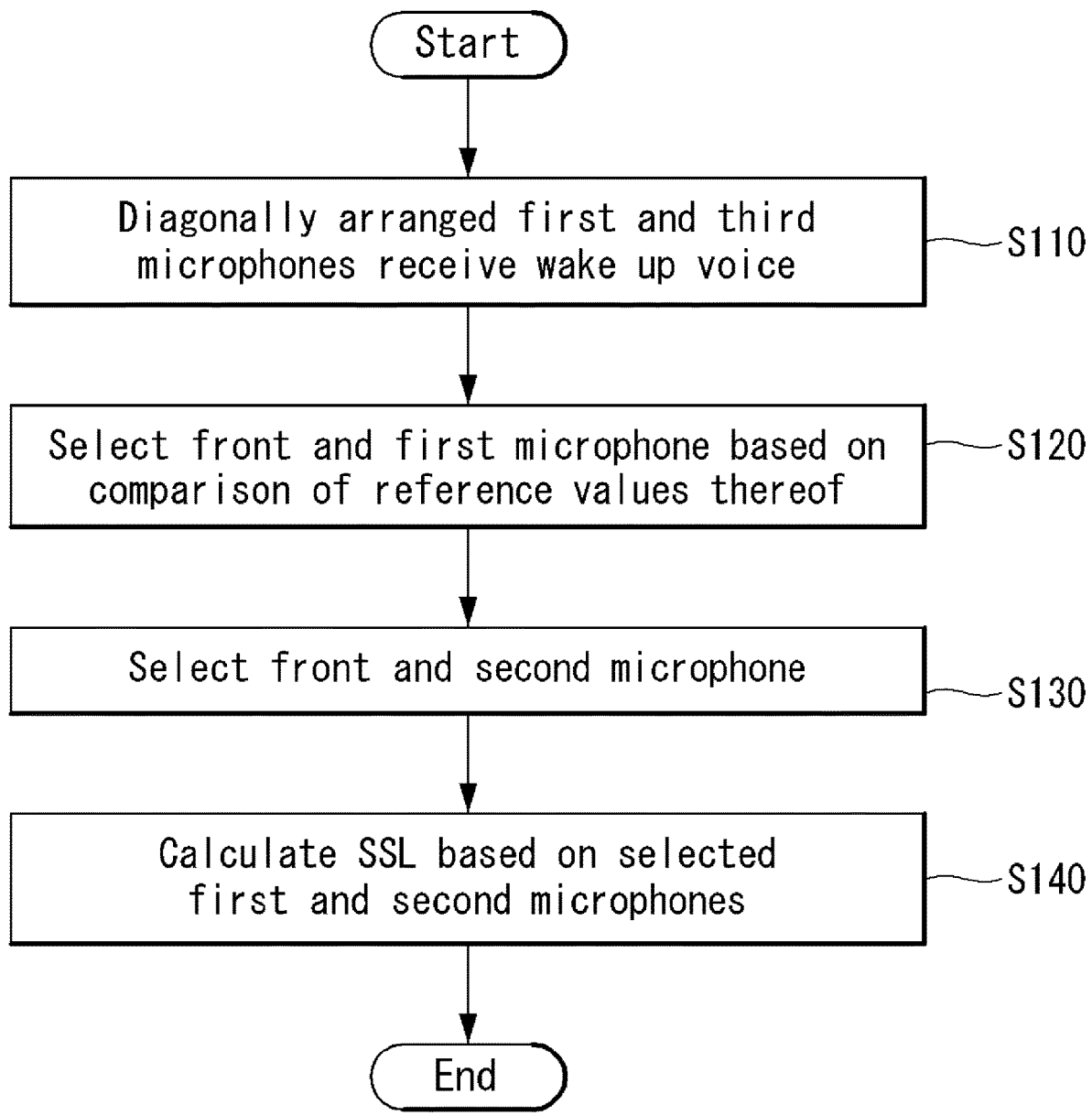
FIG. 9 and FIG. 10 illustrate a method for tracking a direction of a speaker by selecting front and rear microphones based on a received wake up voice according to one embodiment of the present disclosure.
Figure 10:
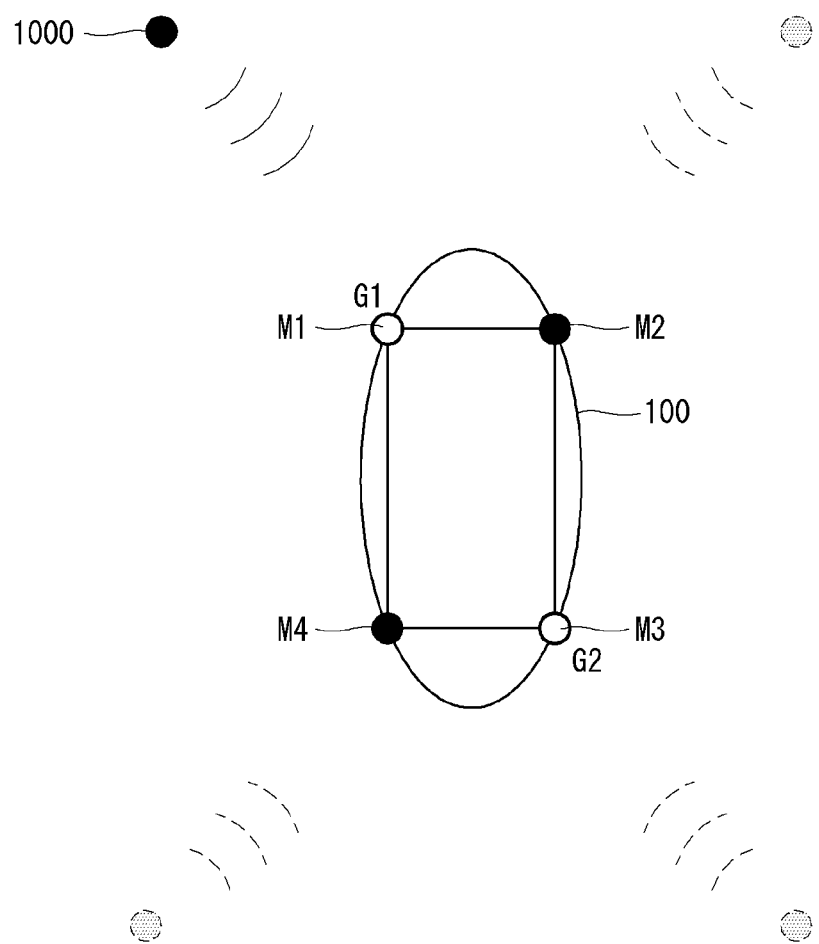

FIG. 9 and FIG. 10 illustrate a method for tracking a direction of a speaker by selecting front and rear microphones based on a received wake up voice according to one embodiment of the present disclosure.

In the tracking method according to an embodiment of the present disclosure, the movable robot 100 may be configured to select one of the forward direction and rearward direction of four directions based on the wake-up voice received through the first and third microphones M1 and M3 arranged in the diagonal direction among the four microphones.

Referring to FIG. 10, when the speaker 1000 located in a front and left direction from the robot uttered a wake-up voice, the first microphone M1 directly receives the wake-up voice that the speaker uttered S110, and the third microphone M3 receives an indirect voice that is reflected or diffracted rather than the direct voice.

The processor 110 calculates a first reference value G1 of the first microphone M1 and a second reference value G2 of the third microphone M3 based on the wake-up voices received from the first microphone M1 and the third microphone M3 respectively. In this connection, the reference value may be one of the gain, the confidence score of a corresponding microphone, and the time it took for the corresponding microphone to receive the wake-up voice.

In a next step S120, the processor 110 compares the first reference value with the second reference value to select either the first microphone or the third microphone. If the reference value is the microphone gain or confidence score, a microphone having a higher microphone gain or confidence score may be selected. In an alternative, if the time taken to receive the wake-up voice is the reference value, the microphone having the short receiving time will be selected.

When the speaker 1000 is away in a front and left direction from the robot as shown in FIG. 10, the first microphone M1 receives the direct sound and the third microphone M3 receives the indirect sound. Thus, the gain confidence score of the first microphone M1 is larger than that of the third microphone M3. Thus, the processor will select the first microphone M1 at this stage.

In a next step S130, the processor 110 selects the second microphone M2 arranged adjacent to the first microphone M1 on the front face, and thus selects the two microphone M1 and M2 as candidates for the GCC algorithm operation.

In a next step S140, the processor 110 calculates a SSL (sound source localization) value by performing the GCC algorithm operation based on the first and second microphones M1 and M2 as selected as the candidates. As a result, the position of the speaker 1000 may be tracked.

In this connection, since a distance from the first microphone M1 to the second microphone M2 is a predetermined value, the SSL (Sound Source Localization) value can be derived based on the first microphone and the second microphone.

Figure 11:
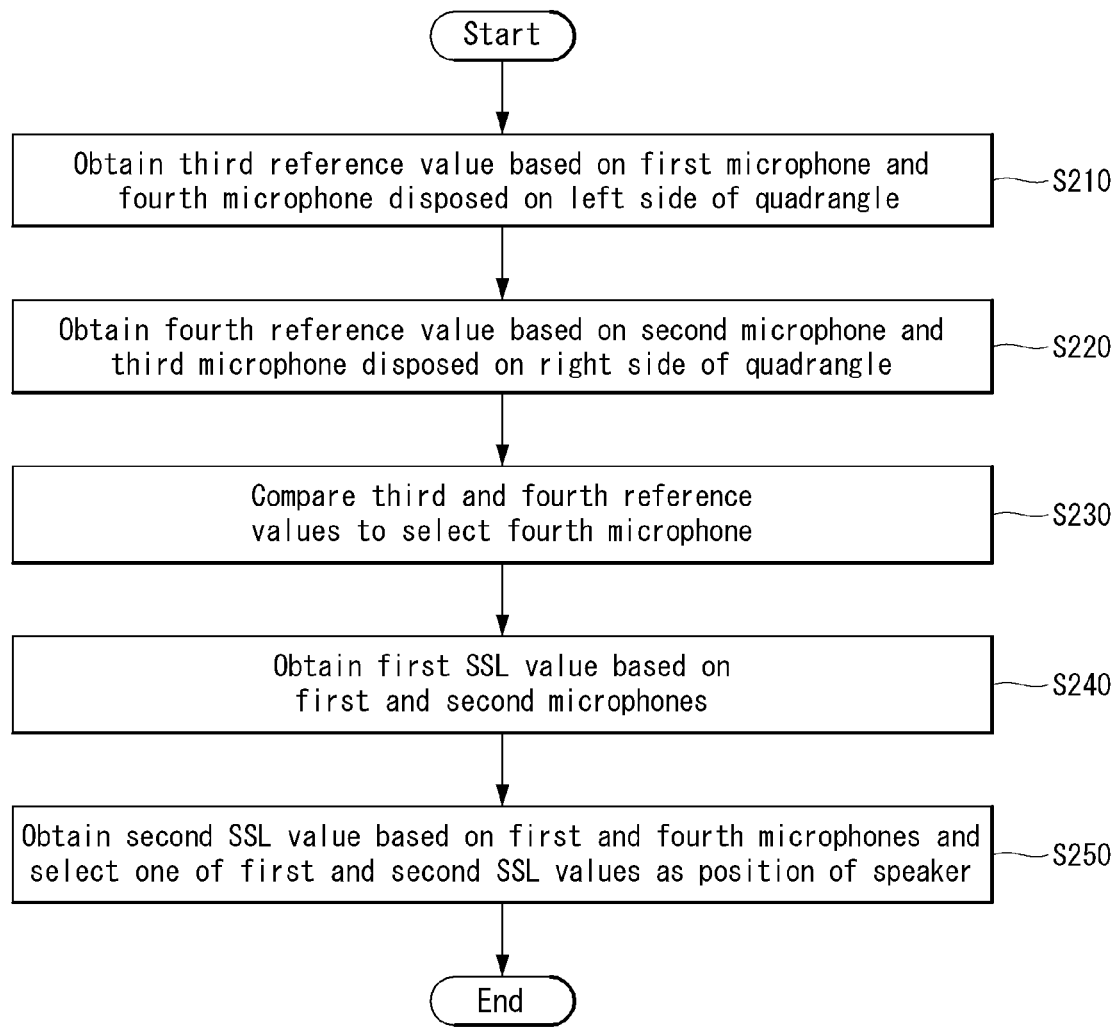
FIG. 11 and FIG. 12 illustrate a method for tracking a direction of a speaker by selecting left and right microphones based on a received wake up voice according to one embodiment of the present disclosure.
Figure 12:
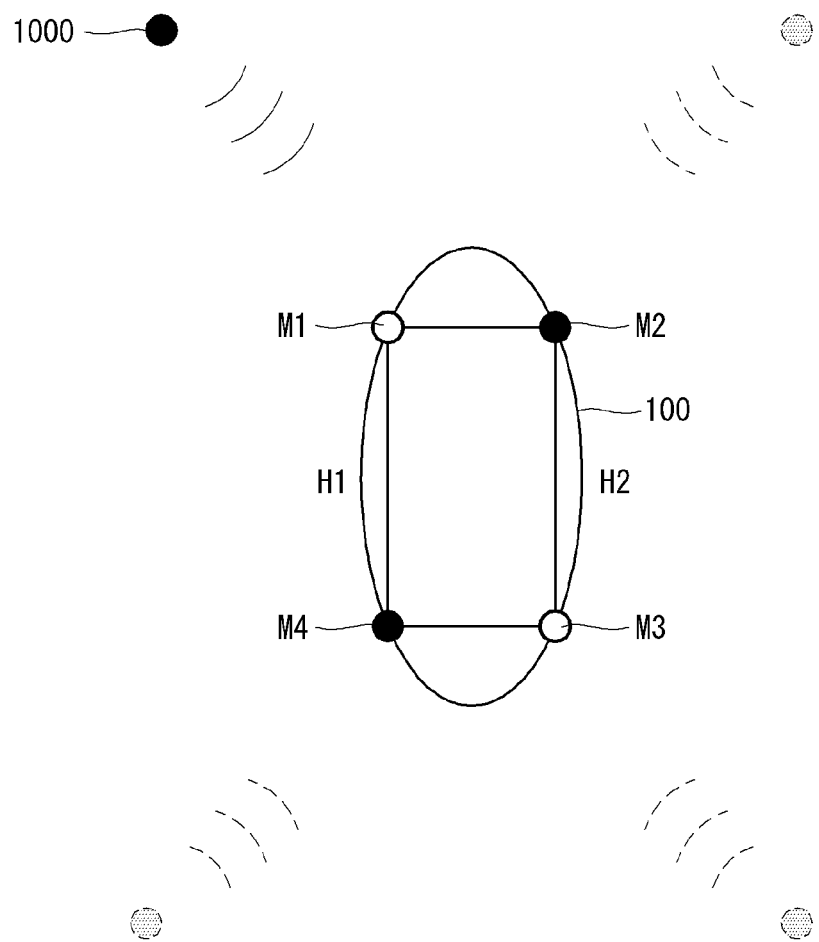
Figure 13:
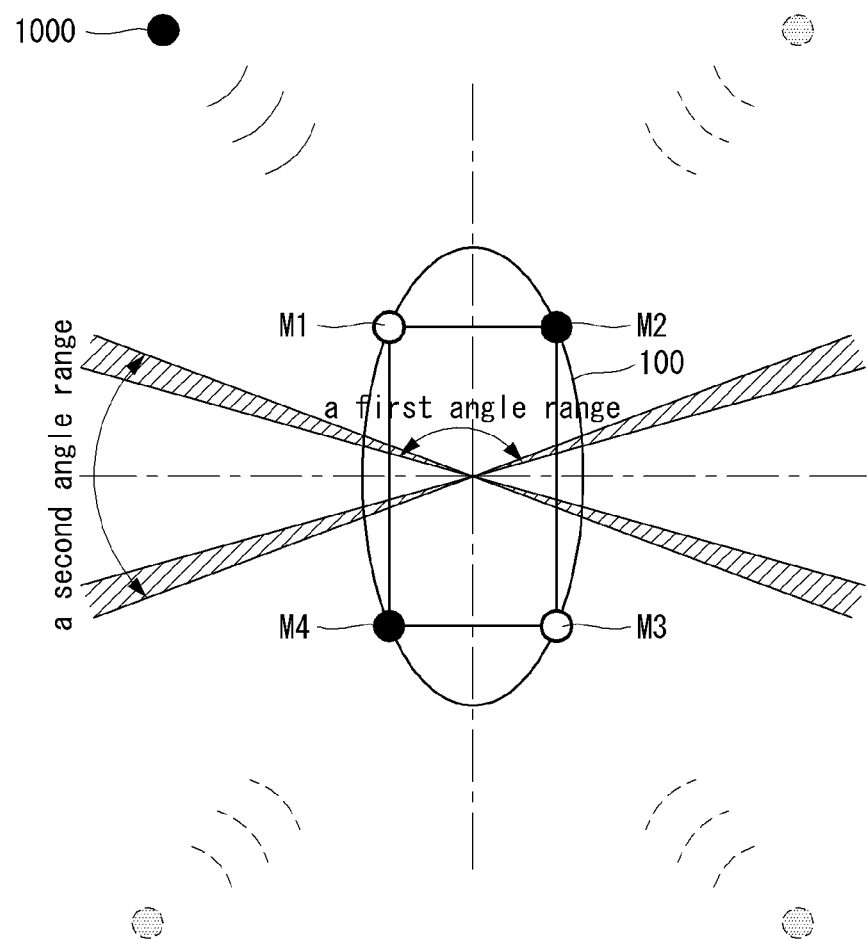
FIG. 13 is a diagram illustrating a first angular range in a front-rear direction and a second angular range in a right-left direction to increase a confidence score.

Hereinafter, referring to FIGS. 11 to 13, a description will be given of a method of deriving a direction in which the robot is closer to the speaker among the left/right directions and combining the selected direction with the SSL value as obtained above to further increase the confidence score. FIG. 11 and FIG. 12 illustrate a method for tracking a direction of a speaker by selecting left and right microphones based on a received wake up voice according to one embodiment of the present disclosure. FIG. 13 is a diagram illustrating a first angular range in a front-rear direction and a second angular range in a right-left direction to increase a confidence score.

Referring to this figure, in a step S200, the processor 110 calculates a third reference value H1 based on the first microphone M1 and the fourth microphone M4 disposed on the left side of the robot, and calculates a fourth reference value H2 based on the second microphone M2 and the third microphone M3 disposed on the right side of the robot.

In this connection, each of the third and fourth reference values may preferably be the gain of a corresponding microphone receiving the wake-up voice, but may not be limited thereto. The time taken to receive the wake-up voice or the confidence score may be used as the reference value.

The processor 110 calculates the third reference value H1 by summing the gain of the first microphone M1 and the gain of the fourth microphone M4, which have received the wake-up voice. The processor 110 calculates the fourth reference value H2 by summing the gain of the second microphone M2 and the gain of the third microphone M3 S210.

In a next step S220, the processor 110 compares the calculated third and fourth reference values H1 and H4 with each other and selects microphones arranged on one of the left and right sides corresponding to a larger value between the third and fourth reference values H1 and H4. For example, if the speaker 1000 is positioned as illustrated in the figure, the third reference value H1 is larger than the fourth reference value H4. Thus, the first and fourth microphones M1 and M4 arranged on the left side of the robot may be selected.

In a next step S230, the processor 110 calculates a first SSL value by applying the GCC algorithm operation based on the first and second microphones M1 and M2 selected previously. In a next step S240, the processor 110 calculates a second SSL value by applying the GCC algorithm calculation based on the first and fourth microphones M1 and M4 selected currently. In other words, the first SSL value is based on the forward direction, and the second SSL value is based on the left direction.

Next, the processor 110 may track the position of the speaker by selecting one value that meets a predetermined condition among the calculated first and second SSL values.

In this connection, the SSL value may be the GCC algorithm application result, and may be an angle value. That is, a specific angle in a range of 360 degrees centered on the movable robot 100 may be an SSL value. For example, when the computed SSL value is 0, this indicates an exact front direction. When the computed SSL value is 180, this indicates an exact rear direction. When the computed SSL value is 270, this indicates an exact left direction. When the computed SSL value is 90, this indicates an exact right direction.

In one example, FIG. 13 is a diagram for illustrating a condition for selecting the first and second SSL values to increase the confidence score.

In one example of the present disclosure, the calculated first and second SSL values may be selected according to a set angle range.

In this connection, the angle range may be a preset value based on a direction, and may be an angle range in which a high confidence score is obtained when tracking the position of the speaker within that angle range. In this connection, the high confidence score means a confidence score of over 80%.

In one example, the movable robot 100 according to an embodiment of the present disclosure has an oval shape elongate in a front-rear direction of the movable robot 100. A distance between the front and rear microphones is larger than a distance between the left and right microphones. In this case, the voice uttered in the forward direction or the rear direction is transmitted directly into the microphones. The voice uttered from a position away in the left or right direction from the robot is received by the microphones as the indirect voice. Thus, the confidence score in the left or right direction may be lower than the confidence score in the forward direction or the rear direction.

Considering this principle, a first angle range as a criterion for selecting the first SSL value may be larger than a second angle range as a criterion for selecting the second SSL value. Further, the first angle range and the second angle range may be set to be partially overlapped with each other. In a preferred example, when a length ratio of a short side and a long side of a rectangle having the four microphones arranged at four corner points thereof is 1:4, the first angle range may be set to 270 to 90 degrees, while the second angle range may be set to 240 to 310 degrees, in order to achieve a satisfactory level of the confidence score.

In consideration of the above condition, the processor 110 may select one of the first and second SSL values in a following order in S250.

As described above, since the confidence score in the forward direction or the rear direction is better than the confidence score in the right direction or the left direction, the processor 110 determines whether the first SSL value calculated based on the forward direction is a value within the first angle range. If the first SSL value is the first angle range, the first SSL value is selected as the position of the speaker. The processor triggers the motion of the movable robot toward the selected position.

If the first SSL value is not within the first angle range, the processor 110 may determine whether the second SSL value is included in the second angle range. If the second SSL value is within the second angle range, the second SSL value is selected as the speaker position. The processor triggers the motion of the movable robot toward the selected position.

If both the first and second SSL values are not within the first and second angle ranges, the processor 110 returns to a process of obtaining new first and second SSL values and then repeats the process of comparing the new first and second SSL values with the first and second angle ranges, respectively.

The method in accordance with the present disclosure as described above may be implemented using a computer readable code on a medium on which a program is recorded. The computer readable medium includes all kinds of recording devices in which data that may be read by a computer system is stored. Examples of media that can be read by a computer include HDD (Hard Disk Drive), SSD (Solid State Disk), SDD (Silicon Disk Drive), ROM, RAM, CD-ROM, magnetic tape, floppy disk, or optical data storage device. The medium also includes a carrier wave, for example, implemented in the form of transmission over the Internet. Accordingly, the above description should not be construed in a limiting sense in all respects and should be considered illustrative. The scope of the present disclosure shall be determined by rational interpretation of the appended claims. All changes within the equivalent range of the present disclosure are included in the scope of the present disclosure.

The invention claimed is:

1. A method for determining, by a movable robot, a position of a speaker by searching for a direction in which a wake-up voice is uttered from the speaker, wherein the movable robot includes first, second, third and fourth microphones respectively installed at four vertices of a rectangle having a short axis and a long axis, wherein the method includes:
   receiving a wake-up voice through the first and the third microphones disposed respectively at first and third vertices in a diagonal direction in accordance with the long axis;
   obtaining a first reference value of the first microphone and a second reference value of the third microphone based on the received wake-up voice;
   comparing the obtained first and second reference values to select the first microphone;
   selecting the second microphone disposed at a second vertex, wherein the second microphone is disposed beside the first microphone in a direction of the short axis;
   calculating a sound source localization (SSL) value based on the selected first and second microphones to determine whether a speaker is in front or behind in a direction of the long axis; and
   tracking a position of the speaker based on the SSL value, wherein a distance between the first and the second microphones is smaller than a distance between the first and the fourth microphones, and
   wherein the first and the second reference values are respectively gains of the first and the third microphones, confidence scores of the first and the third microphones or times required for the first and the third microphones to receive the wake-up voice.

2. The method of claim 1, wherein the method further includes:
   obtaining a third reference value based on the first microphone and the fourth microphone disposed at a fourth vertex of the rectangle;
   obtaining a fourth reference value based on the second microphone disposed at the second vertex and the third microphone;
   comparing the obtained third and fourth reference values to select the fourth microphone to determine whether the speaker is in left or right in a direction of the short axis;
   wherein tracking the position of the speaker includes:
   obtaining a first SSL value based on the first and the second microphones among the selected first, second, and fourth microphones;
   obtaining a second SSL value based on the first and the fourth microphones among the selected first, second, and fourth microphones; and
   determining the position of the speaker based on the first and the second SSL values.

3. The method of claim 2, wherein the method further includes:
   determining whether the first SSL value is within a first angle range, wherein the first angle range is a first preset angle range based on a center of the robot, wherein when the speaker is in the first preset angle range, the first and the second microphones reliably receive the wake up voice from the speaker; and
   when the first SSL value is within the first angle range, determining the first SSL value as the position of the speaker.

4. The method of claim 2, wherein each of the third and fourth reference values is a gain of a corresponding microphone,
   wherein the third reference value is a sum of gains of the first microphone and the fourth microphone,
   wherein the fourth reference value is a sum of gains of the second microphone and the third microphone.

5. The method of claim 3, wherein the method further includes:
   when the first SSL value is not within the first angle range, determining whether the second SSL value is within a second angle range, wherein the second angle range is a second preset angle range based on the center of the robot, wherein when the speaker is in the second preset angle range, the first and the fourth microphones reliably receive the wake up voice from the speaker; and
   when the second SSL value is within the second angle range, determining the second SSL value as the position of the speaker.

6. The method of claim 5,
   wherein the first angle range is greater than the second angle range.

7. The method of claim 6, wherein the first angle range is between 270 to 90 degrees, wherein the second angle range is between 240 to 310 degrees, wherein the first angle range is set to partially overlap the second angle range.

8. A movable robot for determining a position of a speaker, the robot including:
   first, second, third and fourth microphones respectively installed at four vertices of a rectangle having a short axis and a long axis;

a processor; and a memory for storing instructions therein executable by the processor, wherein the processor is configured for:

receiving a wake-up voice through the first and the third microphones disposed respectively at first and third vertices in a diagonal direction in accordance with the long axis;

obtaining a first reference value of the first microphone and a second reference value of the third microphone based on the received wake-up voice;

comparing the obtained first and second reference values to select the first microphone;

selecting the second microphone disposed at a second vertex, wherein the second microphone is disposed beside the first microphone in a direction of the short axis;

calculating a sound source localization (SSL) value based on the selected first and second microphones to determine whether a speaker is in front or behind in a direction of the long axis; and tracking a position of the speaker based on the SSL value, wherein a distance between the first and the second microphones is smaller than a distance between the first and the fourth microphones, and wherein the first and the second reference values are respectively gains of the first and the third microphones, confidence scores of the first and the third microphones or times required for the first and the third microphones to receive the wake-up voice.

9. The robot of claim 8, wherein the processor is further configured for:

obtaining a third reference value based on the first microphone and the fourth microphone disposed at a fourth vertex of the rectangle;

obtaining a fourth reference value based on the second microphone disposed at the second vertex and the third microphone;

comparing the obtained third and fourth reference values to select the fourth microphone to determine whether the speaker is in left or right in a direction of the short axis;

wherein when the processor is configured for tracking the position of the speaker, the processor is configured for:

obtaining a first SSL value based on the first and the second microphones among the selected first, second, and fourth microphones;

obtaining a second SSL value based on the first and the fourth microphones among the selected first, second, and fourth microphones; and determining the position of the speaker based on the first and the second SSL values.

10. The robot of claim 9, wherein the processor is further configured for:

determining whether the first SSL value is within a first angle range, wherein the first angle range is a first preset angle range based on a center of the robot, wherein when the speaker is in the first preset angle range, the first and the second microphones reliably receive the wake up voice from the speaker; and when the first SSL value is within the first angle range, determining the first SSL value as the position of the speaker.

11. The robot of claim 9, wherein each of the third and fourth reference values is a gain of a corresponding microphone, wherein the third reference value is a sum of gains of the first microphone and the fourth microphone, wherein the fourth reference value is a sum of gains of the second microphone and the third microphone.

12. The robot of claim 10, wherein the processor is further configured for:

when the first SSL value is not within the first angle range, determining whether the second SSL value is within a second angle range, wherein the second angle range is a second preset angle range based on the center of the robot, wherein when the speaker is in the second preset angle range, the first and the fourth microphones reliably receive the wake up voice from the speaker; and when the second SSL value is within the second angle range, determining the second SSL value as the position of the speaker.

13. The robot of claim 12, wherein the first angle range is greater than the second angle range.

14. The robot of claim 13, wherein the first angle range is between 270 to 90 degrees, wherein the second angle range is between 240 to 310 degrees, wherein the first angle range is set to partially overlap the second angle range.

* * * * *